(12) United States Patent
Ke

(10) Patent No.: US 11,570,667 B2
(45) Date of Patent: Jan. 31, 2023

(54) METHOD FOR IMPLEMENTING SERVICE, NETWORK UNIT AND TERMINAL

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/039,672

(22) Filed: Sep. 30, 2020

(65) Prior Publication Data

US 2021/0022049 A1 Jan. 21, 2021

Related U.S. Application Data

(63) Continuation of application No. PCT/CN2019/081437, filed on Apr. 4, 2019.

(30) Foreign Application Priority Data

Apr. 4, 2018 (CN) .......................... 201810302350.1

(51) Int. Cl.
*H04W 36/00* (2009.01)
*H04W 36/14* (2009.01)

(52) U.S. Cl.
CPC ... *H04W 36/0022* (2013.01); *H04W 36/0016* (2013.01); *H04W 36/14* (2013.01)

(58) Field of Classification Search
CPC ......... H04W 36/0022; H04W 36/0016; H04W 36/14; H04W 36/0066; H04W 36/00; H04W 36/30; H04W 36/0083

USPC ......................................................... 455/437
See application file for complete search history.

(56) References Cited

U.S. PATENT DOCUMENTS

| | | | |
|---|---|---|---|
| 2012/0100858 A1 | 4/2012 | Qin | |
| 2016/0262058 A1* | 9/2016 | Jeong | ................... H04W 60/00 |
| 2016/0353335 A1 | 12/2016 | Mutikainen et al. | |
| 2017/0099600 A1 | 4/2017 | Jeong et al. | |
| 2018/0063754 A1* | 3/2018 | Wang | ................ H04W 36/0022 |
| 2018/0124661 A1* | 5/2018 | Tsai | ................ H04W 36/00835 |
| 2019/0191349 A1 | 6/2019 | Kim et al. | |
| 2020/0275332 A1* | 8/2020 | Chong | .............. H04W 28/0819 |

(Continued)

FOREIGN PATENT DOCUMENTS

| | | |
|---|---|---|
| CN | 101932057 A | 12/2010 |
| CN | 102404815 A | 4/2012 |

(Continued)

OTHER PUBLICATIONS

Chinese Office Action issued in corresponding application No. 201810302350.1, dated May 6, 2020.

(Continued)

*Primary Examiner* — Hirdepal Singh

(74) *Attorney, Agent, or Firm* — Maschoff Brennan

(57) ABSTRACT

The present disclosure provides a method for implementing service, a network unit and a terminal. The method for implementing service, operable by a terminal, includes: obtaining indication information for an operation from a first network to a second network; determining an operation for the related service, according to the indication information for the operation from the first network to the second network.

20 Claims, 6 Drawing Sheets

(56) References Cited

U.S. PATENT DOCUMENTS

| | | | |
|---|---|---|---|
| 2020/0288367 A1* | 9/2020 | Kim | H04W 36/00 |
| 2020/0305033 A1* | 9/2020 | Keller | H04L 65/1016 |

FOREIGN PATENT DOCUMENTS

| | | | |
|---|---|---|---|
| CN | 103281757 A | 9/2013 | |
| CN | 106537954 A | 3/2017 | |
| CN | 106792941 A | 5/2017 | |
| WO | 2015/160329 A1 | 10/2015 | |
| WO | 2018/038497 A1 | 3/2018 | |

OTHER PUBLICATIONS

International Search Report and Written Opinion issued in corresponding application No. PCT/CN2019/081437, dated Oct. 15, 2020.

"Potential Implementations of Voice Service Continuity from 5G to 2/3G", 3GPP TSG-SA WG1 Meeting #80, Reno, USA, Nov. 25-Dec. 1, 2017.

"TS 23.501: EPS Fallback", SA WG2 Meeting #S2-124, Reno, USA, Nov. 27-Dec. 1, 2017.

"EPS Fallback for Voice", 3GPP TSG-SA WG2 Meeting #126, Montreal, Canada, Feb. 26-Mar. 2, 2018.

Intel et al., EPS Fallback, S2-174550, SA WG2 Meeting #122, Jun. 26-30, 2017, San Jose Del Cabo, Mexico.

Oppo et al., Returning back to NR in case of handover for voice, S2-176977, SA WG2 Meeting #122bis, Oct. 23-27, 2017, Ljubljana, Slovenia.

European Search Report issued in corresponding application No. 19781066.6, dated Apr. 23, 2021.

KR Office Action in Application No. 10-2020-7031493 dated Oct. 5, 2021.

"Clarification on the Emergency HO indication for EPS fallback" 3GPP TSG-SA WG2 Meeting #125, ZTE, S2-180555, Jan. 22, 2018.

* cited by examiner

METHOD FOR IMPLEMENTING SERVICE, NETWORK UNIT AND TERMINAL

CROSS-REFERENCE TO RELATED APPLICATION

This application is a continuation application of International Application No. PCT/CN2019/081437 filed on Apr. 4, 2019, which claims the benefit and priority of Chinese Application No. 201810302350.1, filed on Apr. 4, 2018, the present disclosures of which are incorporated in their entirety by reference herein.

TECHNICAL FIELD

Embodiments of the present disclosure relate to the field of communications technology, and in particular to a method for implementing service, a network unit and a terminal.

BACKGROUND

Operators may adopt hotspot coverage rather than full coverage in an initial stage of deploying 5th Generation (5th Generation, 5G) network. Some operators also have 3rd Generation (3rd Generation, 3G) network with full coverage. The 3G network supports voice services, such as connecting IP Multimedia Subsystem (IP Multimedia Subsystem, IMS) over a circuit switch domain to provide voice services.

When the 5G network supports voice services, a terminal may directly initiate or terminate the voice services on the 5G network. If one terminal that is performing the voice service moves out of the 5G network and there are only 3G neighboring cells, the voice service has to be interrupted because operation between 5G and 3G is not supported.

When the 5G network does not support voice services, if one terminal connected to or camping on the 5G network requires voice services (i.e., initiating or terminating a voice service), the terminal cannot initiate voice services on the 5G network.

The same problem exists for other communication networks in the future.

Therefore, how to realize continuity of services and determine an access domain for the terminal when the communication network does not have full coverage, is a technical problem that needs to be resolved at present.

SUMMARY

Embodiments of the present disclosure provide a method for implementing service, a network unit and a terminal, which can solve the problem of how to realize continuity of services and determine an access domain for the terminal when the communication network does not have full coverage.

In order to solve the above technical problem, the present disclosure is implemented as follows.

In a first aspect, one embodiment of the present disclosure provides a method for implementing service, operable by a first network unit in a first network, including:

obtaining related information of an operation from the first network to a second network;

according to the related information of the operation from the first network to the second network, determining indication information for the operation from the first network to the second network, and/or, determining indication information of whether to support a related service.

In a second aspect, one embodiment of the present disclosure provides a method for implementing service, operable by a second network unit in a first network, including:

obtaining information; wherein the information includes at least one of: related information of an operation from the first network to a second network, or indication information for the operation from the first network to the second network;

performing the operation from the first network to the second network for a terminal, according to the obtained information.

In a third aspect, one embodiment of the present disclosure provides a method for implementing service, operable by a terminal, including:

obtaining indication information for an operation from a first network to a second network;

determining an operation for the related service, according to the indication information for the operation from the first network to the second network.

In a fourth aspect, one embodiment of the present disclosure provides a first network unit in a first network, including:

an obtaining module configured to obtain related information of an operation from a first network to a second network;

a determining module configured to, according to the related information of the operation from the first network to the second network, determine indication information for the operation from the first network to the second network, and/or, determine indication information of whether to support related service.

In a fifth aspect, one embodiment of the present disclosure provides a second network unit in a first network, including:

an obtaining module configured to obtain information; wherein the information includes at least one of: related information of an operation from the first network to a second network, or indication information for the operation from the first network to the second network;

an operation module configured to perform the operation from the first network to the second network for a terminal, according to the obtained information.

In a sixth aspect, one embodiment of the present disclosure provides a terminal, including:

an obtaining module configured to obtain indication information for an operation from a first network to a second network;

a determining module configured to determine an operation for a related service, according to the indication information for the operation from the first network to the second network.

In a seventh aspect, one embodiment of the present disclosure provides a first network unit, including: a processor, a memory, and a program stored on the memory and executable on the processor; wherein the program is executed by the processor to implement steps of the foregoing method operable by the first network unit.

In an eighth aspect, one embodiment of the present disclosure provides a second network unit, including: a processor, a memory, and a program stored on the memory and executable on the processor; wherein the program is executed by the processor to implement steps of the foregoing method operable by the second network unit.

In a ninth aspect, one embodiment of the present disclosure provides a terminal, including: a processor, a memory, and a program stored on the memory and executable on the processor; wherein the program is executed by the processor to implement steps of the foregoing method operable by the terminal.

In a tenth aspect, one embodiment of the present disclosure provides a computer readable storage medium, including a program stored thereon; wherein the program is executed by a processor to implement steps of the foregoing method.

In embodiments of the present disclosure, it is clarified how to achieve service continuity and determine an access domain for the terminal when the first network does not have full coverage.

DETAILED DESCRIPTION

Figure 1:
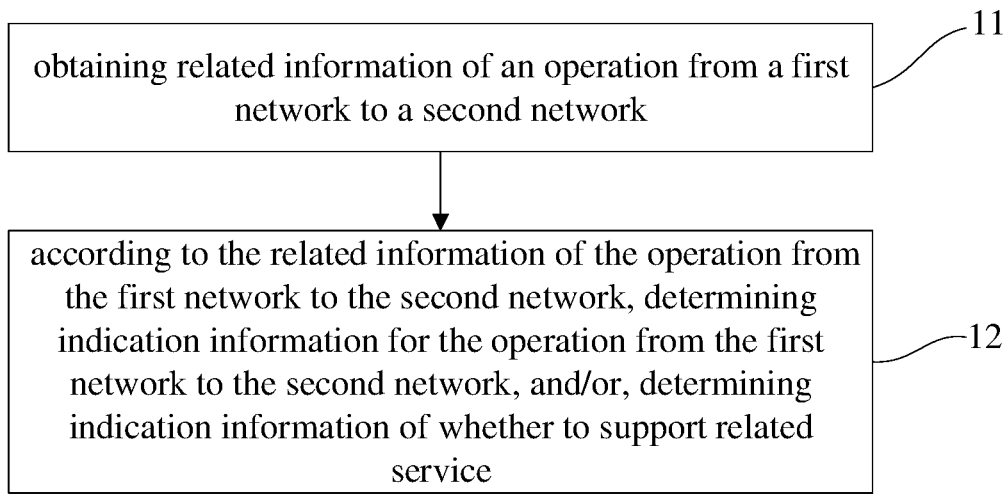
FIG. 1 is a schematic flowchart of a method for implementing service operable by a first network unit according to an embodiment of the present disclosure.

In embodiments of the present disclosure, a network unit may be any network device or network function. For example, the network unit may be a network unit of the radio access network or a network unit of the core network.

In embodiments of the present disclosure, the core network unit may include, but not limited to, at least one of the following: a core network device, a core network node, a core network function, a core network unit, a mobility management entity (Mobility Management Entity, MME), an access management function (Access Management Function, AMF), a session management function (Session Management Function, SMF), a user plane function (User Plane Function, UPF), a serving GW (Serving GW, SGW), a PDN gate way (PDN Gate Way, PDN GW), a policy control function (Policy Control Function, PCF), a policy and charging rules function (Policy and Charging Rules Function, PCRF), a serving GPRS support node (Serving GPRS Support Node, SGSN), or a gateway GPRS support node (Gateway GPRS Support Node, GGSN) radio access network device.

In embodiments of the present disclosure, the network unit of the radio access network may include, but not limited to, at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved Node B (evolved Node B, eNB), a 5G base station (gNB), a radio network controller (Radio Network Controller, RNC), a base station (NodeB), a non-3GPP inter working function (Non-3GPP Inter Working Function, N3IWF), an access controller (Access Controller, AC) node, an access point (Access Point, AP) device or wireless local area networks (Wireless Local Area Networks, WLAN) node.

The base station may be a base transceiver station (Base Transceiver Station, BTS) in a global system for mobile communications (Global System for Mobile communications, GSM) or a code division multiple access (Code Division Multiple Access, CDMA), or may be a base station (NodeB) in a wideband code division multiple access (Wideband Code Division Multiple Access, WCDMA), or may also be an evolutional Node B (evolutional Node B, eNB or e-NodeB) in a long term evolution (LTE) or a 5G base station (gNB), which is not limited in the embodiment of the present disclosure.

In the present disclosure, an evolved LTE (evolved LTE, eLTE) is a way in which an evolved universal terrestrial radio access (Evolved Universal Terrestrial Radio Access, EUTRA) is directly connected to a 5G core network (5G Core, 5GC). An evolved packet system (Evolved Packet System, EPS) may also be referred to as LTE.

In the present disclosure, an emergency service may also be referred to as one of the following: emergency voice service and emergency IMS voice service. An indication of whether the emergency service is supported may include, but not limited to, at least one of the following: an emergency services support indicator (Emergency Services Support indicator) or emergency services fallback (Emergency Services Fallback) support indicator.

In the present disclosure, the voice service may also be referred to as IMS voice service over packet switch (Packet Switch, PS) session. An indication of whether the voice service is supported may include, but not limited to, at least one of the following: an IMS voice service support indicator, an IMS voice over PS session supported indication (IMS voice over PS Session Supported Indication), IMS voice over circuit switch (Circuit Switch, CS) domain support indicator or IMS voice over PS session supported indication over 3GPP (IMS voice over PS Session Supported Indication over 3GPP).

In the present disclosure, the voice service includes an emergency voice service.

In the present disclosure, redirection (Redirection) may refer to a mode in which a radio access network releases a connection between a user equipment (UE) and the network and indicates a redirection frequency.

In the present disclosure, handover from a first network to a second network CS domain may also be referred to as, but not limited to, one of the following: PS to CS single radio voice call continuity (Single Radio Voice Call Continuity, SRVCC) handover, first network SRVCC, SRVCC from a first network to a second network, first network SRVCC handover, PS to CS handover, PS to CS handover from a first network to a second network, voice service continuity support from a first network to a second network, single radio support voice service continuity from a first network to a second network, fallback from a first network to a second network, etc. The standard organization may give other names to them, and the present disclosure is not affected by the names.

In the present disclosure, operation switching from a first network to a second network may also be referred to as, but not limited to, one of the following: interworking of a first network and a second network, or fallback from a first network to a second network.

In the present disclosure, handover from a 5G network to a 3G network CS domain may also be referred to as, but not limited to, one of the following: SRVCC PS to CS handover, 5G SRVCC, 5G to 3G SRVCC, 5G SRVCC handover, PS to CS handover, PS to CS handover from a 5G network to a 3G network, voice service continuity support from a 5G network to a 3G network, fallback from a 5G network to a 3G network, operation from a 5G network to a 3G network, interworking of a 5G network and a 3G network.

In the present disclosure, initiating service may refer to initiating service as a calling party, and terminating service may refer to receiving service as a called party.

The 5G network may include, but not limited to, at least one of the following: a 5G core network, a 5G radio access network, an EUTRA connected to the 5GC, a New Radio (New Radio, NR) connected to the 5GC, an NR, a next generation radio access network (Next Generation Radio Access Network, NGRAN), 5GC, or non-3GPP (Non-3GPP, N3GPP), etc. A network unit of the 5G network may include, but not limited to, at least one of the following: AMF, SMF, UPF, PCF, UDM, gNB, or eNB connected to AMF, etc.

The 3G network may include, but not limited to, at least one of the following: a 3G core network, a 3G radio access network, a CDMA, a 3GPP2 1x, a universal mobile telecommunications system terrestrial radio access network (Universal Mobile Telecommunications System Terrestrial Radio Access Network, UTRAN), a high-speed packet access (High-Speed Packet Access, HSPA), a general packet radio service (General Packet Radio Service, GPRS), a universal terrestrial radio access (Universal Terrestrial Radio Access, UTRA), a radio network subsystem (Radio Network Subsystem, RNS), or a base station subsystem (Base Station Subsystem, BSS), etc. A network unit of the 3G network may include, but not limited to, at least one of the following: a mobile switching center (Mobile Switching Center, MSC), a mobile switching center server (MSC Server), a media gateway (Media Gateway, MGW), an SGSN, a GGSN, or an RNC, NodeB, etc. The 3G network CS refers to a circuit switch domain of the 3G network, and may include, but not limited to, at least one of the 3G network units including 3GPP2 1x, UTRAN, HSPA, MSC, MSC Server, and MGW, etc.

The 4G network may include at least one of the following: a 4G core network, a 4G radio access network, an EUTRA connected to the EPC, an EPC, an EUTRA, an LTE, or an EPS, etc. A network unit of the 4G network may include, but not limited to, at least one of the following: an MME, an SGW, a packet data network gateway (Packet Data Network Gateway, PGW), a home subscriber server (Home Subscriber Server, HSS), or an eNB, etc.

The technical solutions in the embodiments of the present disclosure are clearly described hereinafter with reference to the accompanying drawings in the embodiments of the present disclosure. Apparently, the described embodiments are a part of the embodiments of the present disclosure, but not all of the embodiments. All other embodiments obtained by those skilled in the art based on the embodiments of the present disclosure are within the scope of the present disclosure.

Referring to FIG. 1, FIG. 1 is a schematic flowchart of a method for implementing service operable by a first network unit according to an embodiment of the present disclosure. The first network unit is located in a first network. The method includes:

Step 11: obtaining related information of an operation from a first network to a second network;

Step 12: according to the related information of the operation from the first network to the second network, determining indication information for the operation from the first network to the second network, and/or, determining indication information of whether to support a related service.

In the embodiment of the present disclosure, the following problems are clarified: 1) how to realize continuity of the related service in the case that the first network does not have full coverage; 2) when the first network does not directly support the related service but receives an establishment request for the related service (such as, a protocol data unit (Protocol Data Unit, PDU) session establishment request, quality of service (Quality of Service, QoS) flow establishment request, service request), how to implement the related service; 3) when the continuity of the related service is unable to be guaranteed on the first network, whether the terminal still camps on the first network.

In some optional embodiments of the present disclosure, the first network unit is a network unit in the core network, which does not exclude the possibility that the first network unit is a network unit in the radio access network.

In some optional embodiments of the present disclosure, the first network unit may obtain the related information of the operation from the first network to the second network, from at least one of the following:

configuration obtained;

a terminal;

a core network unit of the first network (such as an access management function (Access Management Function, AMF), a session management function (Session Management Function, SMF), a unified data management (Unified Data Management, UDM));

a radio access network unit of the first network;

a network unit of a third network (such as a mobility management entity (Mobility Management Entity, MME) supporting the operation from the first network to the second network; at this point, the network unit of the third network is a proxy of the operation from the first network and the second network);

a network unit of the second network (such as a mobile switching center server (Mobile Switching Center Server, MSC Server) supporting the operation from the first network to the second network).

In some optional embodiments of the present disclosure, the related information of the operation from the first network to the second network may include at least one of the following:

whether the first network configures a related interface that supports the operation from the first network to the second network;

a related interface mode configured by the first network for the operation from the first network to the second network;

second network capability information of the terminal;

information of whether the terminal supports the operation from the first network to the second network;

information of whether a network unit of the first network (such as AMF, SMF, or NG RAN, which may include the first network unit of the first network) supports the operation from the first network to the second network;

whether the terminal allows the operation from the first network to the second network (for example, whether subscription information of the terminal allows the operation from the first network to the second network);

an IMS session transfer number of the terminal;

information of whether there is the IMS session transfer number of the terminal;

a mobile subscriber international subscriber identifier (MS international Public Switched Telephone Network (PSTN)/(Integrated Service Digital Network) ISDN number (Mobile Subscriber International ISDN number, MSISDN) of the terminal;

information of whether there is the mobile subscriber international subscriber ID of the terminal;

whether a terminal identifier of the terminal in the first network is able to be mapped to a terminal identifier in the second network;

whether a type of an subscription permanent identifier (Subscription Permanent Identifier, SUPI) of the terminal is an international mobile subscriber identification number (International Mobile Subscriber Identification Number, IMSI);

the terminal is in a single registration mode or a dual registration mode;

whether the terminal is a single radio or a dual radio;

whether the terminal is voice centric or data centric;

operator policies;

whether an operator configures the operation from the first network to the second network to support the related service;

whether the operator configures the operation from the first network to the second network to support continuity of the related service;

radio condition;

whether the radio condition of the terminal meets the operation from the first network to the second network;

information of the related service;

whether there is ongoing related service;

whether a request for the related service is received.

In some embodiments, the second network capability information of the terminal may include one of the following: a mobile station (MS) network capability (Mobile Station (MS) network capability), a second network radio capability, a supported circuit switch domain voice codec list, a mobile station class mark 2 (MS Class Mark 2), and a mobile station class mark 3 (MS Class Mark 3).

In some embodiments, the IMS session transfer number of the terminal may include one of the following: a session transfer number-single radio (Session Transfer Number-single Radio, STN-SR), an emergency session transfer number-single radio (Emergency session transfer Number-single Radio, E-STN-SR), and an emergency session transfer number.

In some embodiments, the mobile subscriber international subscriber identifier of the terminal includes: a correlation mobile subscriber international ISDN number (Correlation Mobile Subscriber International ISDN number, C-MSISDN).

In some embodiments, whether the request for the related service is received may include one of: whether a quality of service (QoS) flow establishment request for the related service is received, whether a protocol data unit (Protocol Data Unit, PDU) session establishment request for the related service is received, whether a PDU session modification request for the related service is received, or a service request for the related service is received.

In some embodiments, the information of whether supporting the operation from the first network to the second network include at least one of the following: capability related information of the operation from the first network to the second network. The capability related information of the operation from the first network to the second network includes at least one of: a core network capability of the operation from the first network to the second network, or a radio capability of the operation from the first network to the second network.

Whether the terminal identifier of the terminal in the first network is able to be mapped to the terminal identifier in the second network is determined.

In some embodiments, the type of SUPI may be an IMSI or a network access identifier (Network Access Identifier, NAI). The 3G network does not support terminal identifiers of the NAI type. It is not difficult to understand that when SUPI is an identifier in the first network and 3G is the second network, the identifier of the NAI type cannot be mapped to an identifier in the second network.

In some optional embodiments of the present disclosure, the first network may be a 5G network, and the second network may be a 3G network.

In some embodiments, the related service may include one of the following: a voice service (which may also be referred to as an IMS voice service), and an emergency service (which may also be referred to as an emergency voice service).

In some optional embodiments of the present disclosure, the related interface mode for the operation from the first network to the second network may include at least one of the following:

the first network operates with the second network through a direct interface;

the first network interacts with a third network and then the third network interacts with the second network to realize operations between the first network and the second network.

In some optional embodiments of the present disclosure, when the first network operates with the second network through the direct interface, an interface between the first network and the second network may be an Sv interface.

When the first network interacts with the third network and then the third network interacts with the second network to realize operations between the first network and the second network, an interface between the first network and the third network may be an N26 interface, and an interface the third network and the second network may be an Sv interface.

In some optional embodiments of the present disclosure, the first network may be a 5G network and the second network may be a 3G network, then the related interface for the operation from the first network to the second network may include at least one of the following:

whether the first network is configured to support an Sv interface, such as an interface between AMF and a mobile switching center (Mobile Switching Center, MSC), or an interface between AMF and an MSC server (Server); the Sv interface is an interface between the 4G network and the 3G network;

whether the first network is configured to support an N26 interface, such as whether a 4G network unit (such as MME) connected to the first network unit through the N26 interface supports forwarding 5G single radio voice call continuity (Single Radio Voice Call Continuity, SRVCC); the N26 interface is an interface between the 5G network and the 4G network;

whether the first network is configured with an interface supporting 5G network to the 3G network, such as an interface between AMF and MSC, or an interface between AMF and MSC Server;

whether a network unit of the 3G network supporting the interface of the 5G network to the 3G network supports the operation from the 5G network to the 3G network.

The above various interfaces are described hereinafter in detail.

In order to allow the terminal to enjoy the high-speed data connection of the 5G network as well as to support the continuity of the voice service on the one hand; on the other hand, to avoid or minimize the impact on the 3G network, the following architecture may exist:

1) the 5G network unit (such as AMF) supports the Sv interface to be connected to the 3G network unit (MSC), i.e., reusing the existing protocol definition on the Sv interface to avoid changes to the 3G network;

2) interworking of the 3G network and the 5G network is supported by a proxy 4G network unit; an N26 interface is supported between the 5G network unit (such as AMF) and a 4G network unit (such as MME), and then the 4G network unit supports an Sv interface to be connected with the 3G network unit; the 4G network unit acts as a 3G network proxy;

3) a new interface is defined between the 5G network unit and the 3G network unit.

In some optional embodiments of the present disclosure, the operation from the first network to the second network may include at least one of: handover from the first network to the second network, handover from the first network to the second network CS domain, and maintaining continuity of the related service.

In some optional embodiments of the present disclosure, the indication information for the operation from the first network to the second network may include at least one of the following:

indication information of whether the operation from the first network to the second network is able to be performed; specifically, a parameter value in the indication information may be whether it is able to be performed (such as, enable, available, possible) or whether it is executed; for example, able to be perform the operation from the first network to the second network (the operation from the first network to the second network being available, or enabling the operation from the first network to the second network), or executing the operation from the first network to the second network; for "able to be perform", a receiver obtaining the indication information may decide when to perform the operation from the first network to the second network; for "executed", the receiver obtaining the indication information may decide to immediately execute the operation from the first network to the second network;

indication information of whether circuit switch (CS) handover from the first network to the second network is able to be performed;

indication information of whether service continuity is able to be maintained.

In some optional embodiments of the present disclosure, the operation from the first network to the second network may include at least one of the following:

handover from the first network to the second network;

handover from the first network to the second network CS domain;

maintaining continuity of the related service.

In some embodiments, the operation of maintaining the continuity of the related service may be: when the terminal moves out of coverage of the first network or a signal quality of the first network is no longer sufficient for access, for the continuity of the related service, performing handover to the second network that is able to support the related service.

In the embodiment of the present disclosure, optionally, the indication information for the operation from the first network to the second network may include: indication information of handover from the first network to the second network (capable of performing handover from the first network to the second network, or executing handover from the first network to the second network), indication information of handover from the first network to the second network CS domain (capable of performing handover from the first network to the second network CS domain, or executing handover from the first network to the second network), and/or indication information of maintaining continuity of the related service (capable of maintaining continuity of the related service, or executing maintenance of continuity of the related service), in case that the related information of the operation from the first network to the second network includes at least one of the following:

the terminal supports the operation from the first network to the second network;

the first network supports the operation from the first network to the second network;

the first network supports a related interface (such as Sv, N26 or a new interface in the 5G network and the 3G network) for the operation from the first network to the second network;

receiving a request for the related service (such as a QoS establishment request, a PDU session establishment request, a PDU session modification request or a service request);

there is an ongoing related service (whether it is a voice service can be identified by QFI=1; whether it is an emergency service can be identified by an emergency service indication;

a terminal identifier of the terminal in the first network is able to be mapped to the terminal identifier in the second network;

a type of SUPI of the terminal is IMSI;

the terminal allows operation from the first network to the second network;

a MS session transfer number of the terminal exists or is obtained;

information of the mobile subscriber international subscriber identifier of the terminal exists or is obtained;

the operator configures the operation from the first network to the second network to support the related service through;

the operator configures the operation from the first network to the second network to support continuity of the related service through;

radio condition of the terminal meets handover from the first network to the second network (for example, there is a 3G cell or a 3G frequency that meets handover requirement);

the terminal is in a single registration mode;

the terminal is a single radio;

the terminal is voice centric.

In some optional embodiments of the present disclosure, the first network unit may transmit indication information for the operation from the first network to the second network to the terminal, the second network unit, and/or a network unit in the radio access network.

In some optional embodiments of the present disclosure, the step of according to the related information of the operation from the first network to the second network, determining indication information of whether to support a related service, may include:

according to the related information of the operation from the first network to the second network, judging whether the following conditions are met: whether capable of performing the operation from the first network to the second network, whether capable of performing handover from the first network to the second network CS domain, and/or, whether capable of guaranteeing the continuity of the related service;

according to a judgment result, determining the indication information of whether the related service is supported.

In the embodiment of the present disclosure, the indication information of whether to support the related service indicates that the related service is supported, in case that the at least one of the following conditions is met:

capable of performing the operation from the first network to the second network;

capable of performing handover from the first network to the second network;

capable of performing handover from the first network to the second network CS domain;

capable of maintaining the continuity of the related service.

The indication information of whether to support the related service indicates that the related service is not supported, in case that the at least one of the following conditions is met:

the operation from the first network to the second network is not supported;

handover from the first network to the second network is not supported;

handover from the first network to the second network CS domain is not supported;

the continuity of the related service is unable to be guaranteed.

In some optional embodiments of the present disclosure, the indication information that determines whether to support the related service may include at least one of the following:

indication information of whether to support IMS voice service;

indication information of whether to support IMS voice service over packet switch domain;

indication information of whether to support MS voice service over PS session over 3GPP;

indication information of whether to support IMS voice service over CS;

indication information of whether to support emergency service;

indication information of whether to support emergency service rollback.

In some optional embodiments of the present disclosure, the first network unit may transmit the indication information of whether to support the related service to the terminal, the second network unit, and/or the network unit in the radio access network.

In the foregoing embodiment of the present disclosure, optionally, the first network is a 5G network, and the second network is a 3G network. The first network and the second network may also be other types of networks. Optionally, a data transmission rate of the first network is greater than a data transmission rate of the second network.

Figure 2:
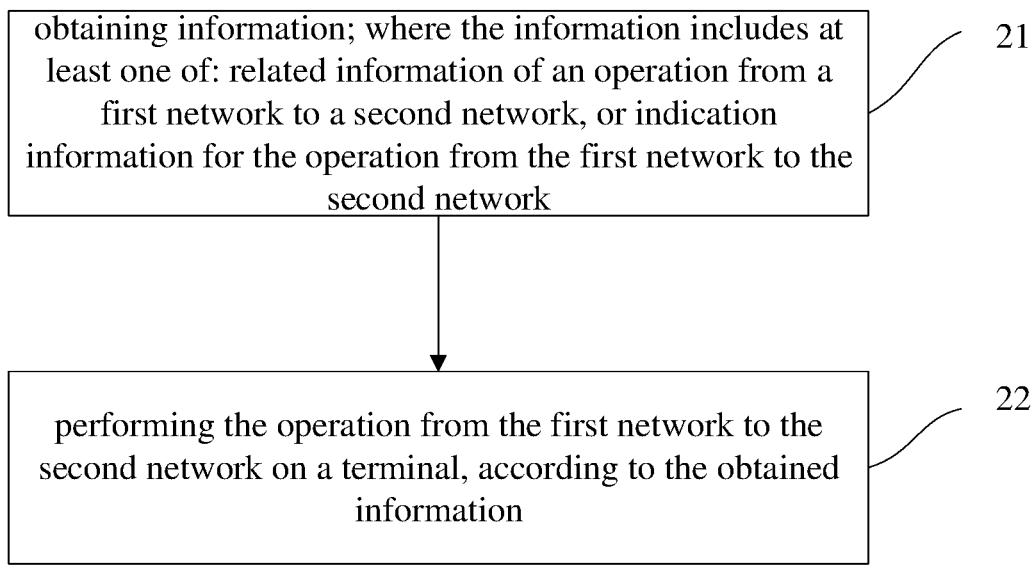
FIG. 2 is a schematic flowchart of a method for implementing service operable by a second network unit according to an embodiment of the present disclosure.

Referring to FIG. 2, FIG. 2 is a schematic flowchart of a method for implementing service operable by a second network unit according to an embodiment of the present disclosure. The second network unit is located in a first network. The method includes:

Step 21: obtaining information; where the information includes at least one of: related information of an operation from a first network to a second network, or indication information for the operation from the first network to the second network;

Step 22: performing the operation from the first network to the second network for a terminal, according to the obtained information.

In the embodiment of the present disclosure, the following problems are clarified: 1) how to realize continuity of the related service in the case that the first network does not have full coverage; 2) when the first network does not directly support the related service but receives an establishment request for the related service (such as, a PDU session establishment request, QoS flow establishment request, service request), how to implement the related service; 3) when the continuity of the related service is unable to be guaranteed on the first network, whether the terminal still camps on the first network.

In some optional embodiments of the present disclosure, the second network unit may be a network unit in the radio access network or a network unit in the core network.

In some embodiments of the present disclosure, the second network unit may receive the information from a first network unit and/or the terminal.

In some optional embodiments of the present disclosure, the related information of the operation from the first network to the second network is as described in the method embodiment of the first network unit shown in FIG. 1, and details are not described herein.

In some optional embodiments of the present disclosure, the indication information for the operation from the first network to the second network is as described in the method embodiment of the first network unit shown in FIG. 1, and details are not described herein.

In some optional embodiments of the present disclosure, the operation from the first network to the second network may include at least one of the following:

related operations of handover from the first network to the second network;

related operations of handover from the first network to the second network CS domain;

maintaining continuity of the related service.

In some optional embodiments of the present disclosure, the related operations of handover from the first network to the second network may include at least one of the following:

initiating a handover procedure from the first network to the second network;

initiating a handover procedure from the first network to the second network CS domain;

transmitting an instruction of handover from the first network to the second network CS domain, and redirecting the terminal to the second network.

The handover procedure from the first network to the second network may include at least one of the following:

selecting a cell of the second network;

instructing handover from the first network to the second network CS domain in an initiated handover request;

including information of a source radio access network to a target radio access network transparent container (such as source RNC to Target RNC Transparent Container) in a handover request;

including MS Class Mark 2 in a handover request;

including MS Class Mark 3 in a handover request;

configuring the terminal under the first network to perform measurement on the second network;

obtaining a measurement report of the second network from the terminal.

The procedure of redirecting the terminal to the second network may include at least one of the following:

transmitting, to the terminal, a frequency indicating a second network in redirection frequencies;

instructing handover from the first network to the second network CS domain in an initiated handover request;

releasing connection of the terminal;

indicating frequency related information of the second network in broadcast cell reselection information;

including frequency related information of the second network in cell reselection information transmitted to the terminal.

In some optional embodiments of the present disclosure, the step of performing the operation from the first network to the second network for a terminal, according to the obtained information, may include at least one of the following:

performing the operation from the first network to the second network, when the information indicates capable of perming the operation from the first network to the second network or capable of maintaining continuity of the related service;

not performing the operation from the first network to the second network or releasing radio connection of the terminal, when the information indicates of not capable of perming the operation from the first network to the second network or not capable of maintaining continuity of the related service;

performing the operation from the first network to the second network, when the information indicates that there is occurrence of a handover event of the related service handover out of the first network, and capable of perming the operation from the first network to the second network or capable of maintaining continuity of the related service;

not performing the operation from the first network to the second network or not releasing radio connection of the terminal, when the information indicates that there is occurrence of a handover event of the related service handover out of the first network, and not capable of perming the operation from the first network to the second network or not capable of maintaining continuity of the related service;

initiating a handover operation from the first network to the second network CS domain, when the information indicates that an instruction of handover from the first network to the second network CS domain is received;

initiating a handover operation from the first network to the second network CS domain, when the information indicates an instruction of handover from the first network to the second network CS domain and a QoS flow establishment request for the related service is received;

initiating a handover operation from the first network to the second network CS domain, when the information indicates that there is no occurrence of a handover event of the related service handover out of the first network, an instruction of handover from the first network to the second network CS domain is received and a QoS flow establishment request for the related service is received.

In some optional embodiments of the present disclosure, the first network may be a 5G network, and the second network may be a 3G network.

In some optional embodiments of the present disclosure, the related service may include one of the following: a voice service and an emergency service.

Figure 3:
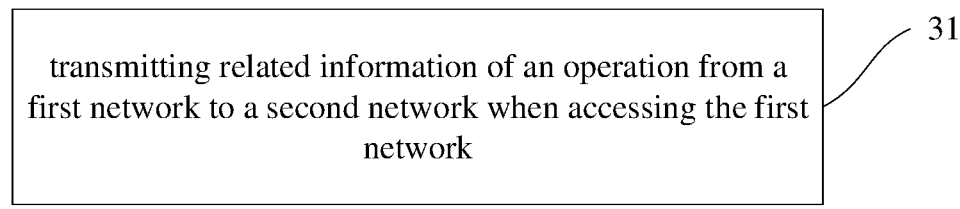
FIG. 3 is a schematic flowchart of a method for implementing service operable by a terminal according to an embodiment of the present disclosure.

Referring to FIG. 3, FIG. 3 is a schematic flowchart of a method for implementing service operable by a terminal according to an embodiment of the present disclosure. The method includes:

Step 31: transmitting related information of an operation from a first network to a second network when accessing the first network.

In the embodiment of the present disclosure, the following problems are clarified: 1) how to realize continuity of the related service in the case that the first network does not have full coverage; 2) when the first network does not directly support the related service but receives an establishment request for the related service (such as, a PDU session establishment request, QoS flow establishment request, service request), how to implement the related service; 3) when the continuity of the related service is unable to be guaranteed on the first network, whether the terminal still camps on the first network.

In some embodiments, the terminal transmits, to a first network unit and/or a second network unit, the related information of the operation from the first network to the second network.

In some optional embodiments of the present disclosure, the related information of the operation from the first network to the second network is as described in the method embodiment of the first network unit shown in FIG. 1, and details are not described herein.

In some optional embodiments of the present disclosure, after the step of transmitting related information of an operation from a first network to a second network, the method further includes: obtaining indication information for the operation from the first network to the second network. The indication information for the operation from the first network to the second network is as described in the method embodiment of the first network unit shown in FIG. 1, and details are not described herein. In some embodiments, the terminal receives, from the first network unit and/or the second network unit, the indication information for the operation from the first network to the second network.

Figure 4:
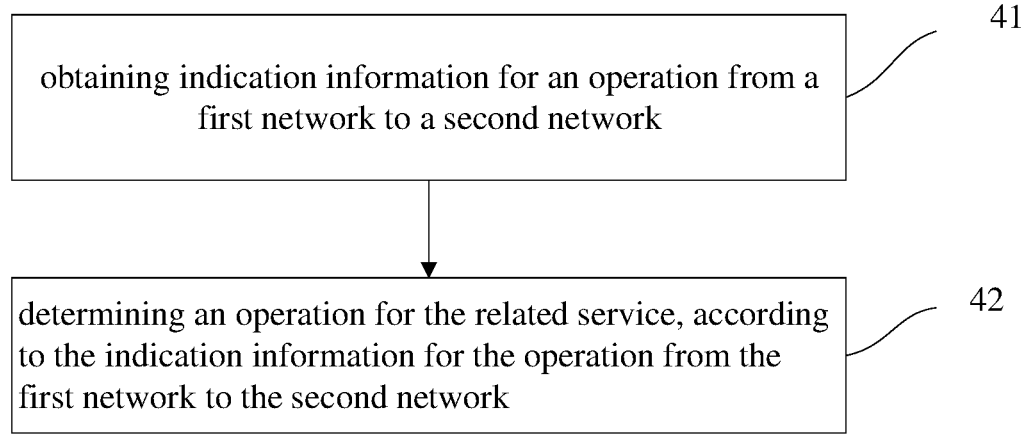
FIG. 4 is a schematic flowchart of a method for implementing service operable by a terminal according to another embodiment of the present disclosure.

Referring to FIG. 4, FIG. 4 is a schematic flowchart of a method for implementing service operable by a terminal according to another embodiment of the present disclosure. The method includes:

Step 41: obtaining indication information for an operation from a first network to a second network;

Step 42: determining an operation for the related service, according to the indication information for the operation from the first network to the second network.

In the embodiment of the present disclosure, the following problems are clarified: 1) how to realize continuity of the related service in the case that the first network does not have full coverage; 2) when the first network does not directly support the related service but receives an establishment request for the related service (such as, a PDU session establishment request, QoS flow establishment request, service request), how to implement the related service; 3) when the continuity of the related service is unable to be guaranteed on the first network, whether the terminal still camps on the first network.

In some embodiments of the present disclosure, the terminal may receive, from a first network unit and/or a second network unit, the indication information for the operation from the first network to the second network.

In some optional embodiments of the present disclosure, before the step of obtaining indication information for an operation from a first network to a second network, the method may further include: transmitting related information of the operation from the first network to the second network when accessing the first network. In some embodiments, the terminal transmits, to a first network unit and/or a second network unit, the related information of the operation from the first network to the second network.

In some optional embodiments of the present disclosure, the indication information for the operation from the first network to the second network is as described in the method embodiment of the first network unit shown in FIG. 1, and details are not described herein.

In some optional embodiments of the present disclosure, the operation for the related service may include at least one of the following:
selecting an access domain;
determining whether to camp on the first network;
determining whether to initiate or terminate a request for the related service on the first network.

In some embodiments, determining whether to initiate a request for the related service on the first network may include one of the following: determining whether to initiate a QoS flow establishment request for the related service on the first network, determining whether to initiate a PDU session establishment request for the related service on the first network, determining whether to initiate a PDU session modification request for the related service on the first network, determining whether to initiate a service request for the related service on the first network, or determining whether to initiate a service request for indicating the related service on the first network.

It is not difficult to understand that the terminal may determine whether the related service can be initiated and terminated in the first network; whether the continuity of the related service can be maintained as the terminal moves after the first network initiates the related service; whether to initiate the related service on the first network. The related services may include voice services and emergency services. There are two ways for the emergency services: one is to initiate a PDU session establishment for emergency services; the other is to initiate a service request for indicating emergency services.

In some optional embodiments of the present disclosure, when the indication information indicates capable of perming the operation from the first network to the second network or capable of maintaining continuity of the related service, the step of determining an operation for the related service may include at least one of the following:
initiating or terminating the related service on the first network;
initiating establishment of a PDU session for the related service on the first network;
initiating a service request for indicating the related service on the first network;
selecting to camp on the first network.

When the indication information indicates not capable of perming the operation from the first network to the second network or not capable of maintaining continuity of the related service, the step of determining an operation of the related service may include at least one of the following:
not initiating or terminating the related service on the first network;
not initiating establishment of a PDU session for the related service on the first network;
not initiating a service request for indicating the related service on the first network;
not camping on the first network.

In some optional embodiments of the present disclosure, the first network may be a 5G network and the second network may be a 3G network. The related service may include one of the following: a voice service and an emergency service.

Since the 5G network may not support interworking between the 5G network and the 3G network (such as handover from the 5G network to the 3G network CS domain). The terminal may also not support interworking between the 5G network and the 3G network (such as handover from the 5G network to the 3G network CS domain). Even if it can be supported, it is not necessarily allowed to perform handover from the 5G network to the 3G network CS domain. When the 5G network supports interworking with the 3G network, it is not clear whether a specific terminal can initiate a handover from the 5G network to the 3G network (such as, a handover from the 5G network to the 3G network CS domain).

When the operation from the 5G network to the 3G network is not required, even if the terminal supports the operation from the 5G network to the 3G network, the 5G radio access network may not configure a UE to perform 3G measurement.

When the operation from the 5G network to the 3G network is required, the 5G radio access network should configure a UE to perform 3G measurement, so as to subsequently initiate handover from the 5G network to the 3G network.

According to the foregoing method of the present disclosure, the radio access network can correctly determine the related operations from 5G to 3G, thereby ensuring the continuity of the voice service or ensuring the initiation and termination of the voice service. The terminal may also determine whether the voice service can be initiated and terminated on the 5G network; after the voice service is initiated on the 5G network, whether the continuity of the voice service can be maintained with the movement of the terminal; and whether to initiate the voice service on the 5G network.

The foregoing method of the present disclosure will be described hereinafter in detail with reference to specific embodiments.

First Embodiment

Figure 5:
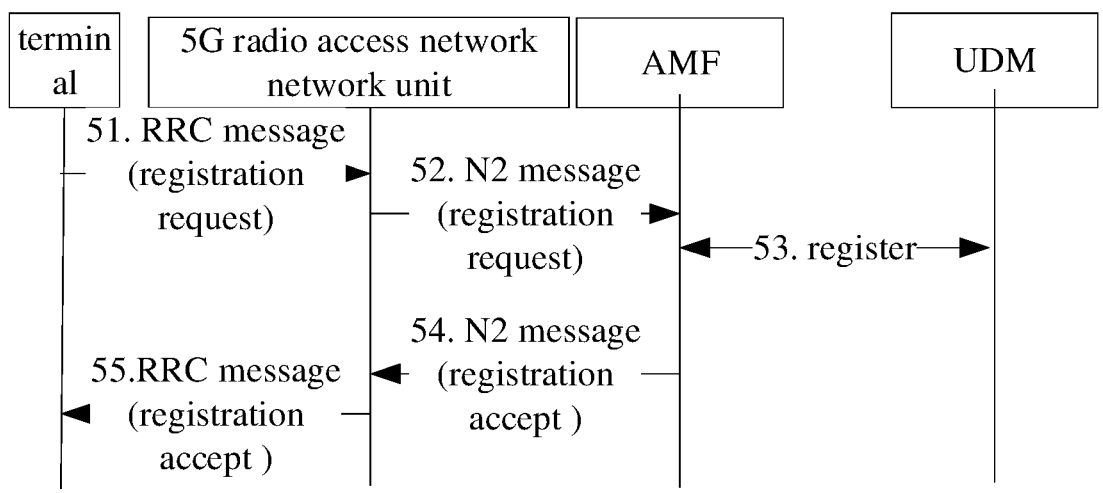
FIG. 5 is a schematic flowchart of a method for implementing service according to a first embodiment of the present disclosure.

Referring to FIG. 5, FIG. 5 is a schematic flowchart of a method for implementing service according to a first embodiment of the present disclosure. The method for implementing service of the embodiment of the present disclosure includes the following steps.

Step 51: a terminal transmits a radio resource control (Radio Resource Control, RRC) message to a 5G radio access network, where the RRC message includes a registration request message.

Step 52: the 5G radio access network transmits an N2 interface message to a 5G core network (such as AMF), where the N2 interface message includes the registration request message.

Optionally, the RRC message may include related information of an operation from a first network to a second network (as described in the step 12, which will not be described herein), such as at least one of the following: related information of a radio capability of the terminal on the operation from the 5G network to the 3G network, or related information of 3G network capability of the terminal.

Optionally, the N2 interface message (such as an initial UE message) may include the related information of the operation from the first network to the second network (as described in the step 12, which will not be described herein), such as at least one of the following: the related information of the radio capability of the terminal on the operation from the 5G network to the 3G network, the related information of the 3G network capability of the terminal, or related information of a radio capability of the 5G wireless access network on the operation from the 5G network to the 3G network.

Optionally, the registration request message may include the related information of the operation from the first network to the second network (as described in the step 12, which will not be described herein), such as at least one of the following: related information of capability of the terminal on the operation from the 5G network to the 3G network, or related information of the 3G network capability of the terminal.

In one embodiment, the related information of the 3G network capability of the terminal is MS network capability information.

In one embodiment, the related information of the capability of the terminal on the operation from the 5G network and the 3G network may include at least one of: related information of a capability of handover from the 5G network to the 3G network, related information of a capability of redirecting the 5G network to the 3G network, related information of a capability of handover from the 3G network to the 5G network, or related information of a capability of redirecting the 3G network to the 5G network.

In one embodiment, the related information of the capability of handover from the 5G network to the 3G network may include at least one of: related information of capability of handover from the 5G network to the 3G network CS domain, related information of capability of handover from the 5G network to the 3G network PS domain, and related information of capability of maintaining voice continuity during handover from the 5G network to the 3G network CS domain.

It is not difficult to understand that the related information of the capability on the operation at least includes: whether to support the indication information for the operation. For example, the related information of capability of maintaining voice continuity during handover from the 5G network to the 3G network CS domain may at least include: whether to support indication information of maintaining the voice continuity during handover from the 5G network to the 3G network CS domain. The related information of the capability of handover from the 5G network to the 3G network CS domain may at least include: whether to support indication information of handover from the 5G network to the 3G network CS domain.

It is not difficult to understand that one terminal with a capability of interworking with the 5G network and the 3G network, supports interworking of the 5G network and the 3G network; one terminal without a capability of interworking with the 5G network and the 3G network, does not support interworking of the 5G network and the 3G network.

Step 53: the 5G core network registers with UDM, and obtains from the UDM at least one of the following: subscription information of the terminal (whether to allow the terminal to perform operation from the 5G network to the 3G network); a type of SUPI of the terminal; an IMS session transfer number (an initial IMS session transfer number may be a dummy IMS session transfer number; whether the terminal allows the terminal to perform operation from the 5G network to the 3G network may be determined from whether the IMS session transfer number can be obtained), or MSISDN. Optionally, the subscription information may at least include: whether the terminal is allowed to perform.

In one embodiment, interworking of the 5G network and the 3G network performed by the terminal includes at least one of: handover from the 5G network to the 3G network, 5G to 3G redirection, handover from the 3G network to the 5G network, or 3G to 5G redirection.

In one embodiment, handover from the 5G network to the 3G network may include at least one of: handover from the 5G network to 3G network CS domain, handover from the 5G network to 3G network PS domain, maintaining voice continuity during handover from the 5G network to 3G network CS domain.

In one embodiment, whether the terminal is allowed to perform interworking of the 5G network and the 3G network may be determined by whether STN-SR can be obtained. When the STN-SR is obtained, it means allowed, otherwise it means not allowed.

In one embodiment, when the type of SUPI is IMSI, it means supporting interworking of the 5G network and the 3G network. When the type of SUPI is other type (such as NAI) rather than IMSI, it means not supporting interworking of the 5G network and the 3G network. It is not difficult to understand that the SUPI type of one terminal having a capability of interworking with the 5G network and the 3G network or supporting interworking of the 5G network and the 3G network, is IMSI.

The 5G core network may also learn at least one of the following: related information of whether to support an interworking interface, or whether other network unit supports interworking of the 5G network and the 3G network. In one embodiment, the 5G core network obtains the information through configuration.

Step 54: the 5G core network determines related indication information for the operation from the 5G network to the 3G network, according to the obtained related information of the operation from the 5G network to the 3G network. The 5G core network transmits an N2 interface message (such as an initial UE context setup request message or a downlink NAS transport message) to the 5G radio access network. Optionally, the message includes the related indication information for the operation from the 5G network to the 3G network. The message includes a registration accept message addressed to the terminal. Optionally, the registration accept message includes related indication information for the operation from the 5G network to the 3G network.

In one implementation, the 5G radio access network performs related operations from the 5G network to the 3G network for the terminal, according to the obtained indication information of the operation from the 5G network to the 3G network.

Step 55: the 5G radio access network transmits an RRC message to the terminal. Optionally, the registration accept message includes related indication information for the operation from the 5G network to the 3G network.

In one implementation, the terminal learns from the message the related indication information (the voice continuity can be maintained) for the operation from the 5G network to the 3G network, and determines a processing operation of the service according to the obtained related indication information for the operation from the 5G network to the 3G network.

After receiving indication information for the operation from the first network to the second network, the terminal may determine the operation of the related service according to the indication information for the operation from the first network to the second network, which is specifically described in the step 32 and will not be repeated herein.

Second Embodiment

In the second embodiment, a terminal initiates a PDU session of the related service on a 5G network, and the 5G network initiates a handover to hand over the terminal to 3G, thereby supporting voice services.

Figure 6:
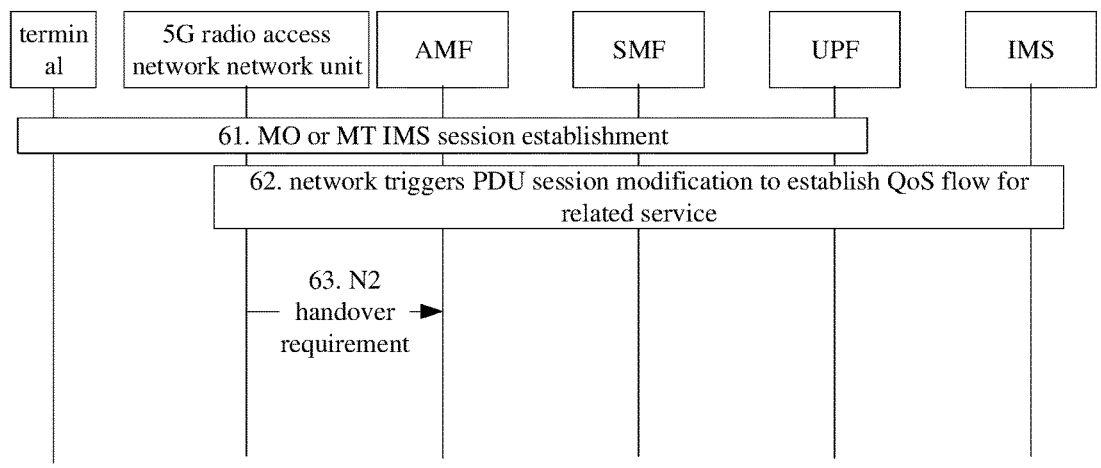
FIG. 6 is a schematic flowchart of a method for implementing service according to a second embodiment of the present disclosure.

Referring to FIG. 6, FIG. 6 is a schematic flowchart of a method for implementing service according to a second embodiment of the present disclosure. The method for implementing service of the embodiment of the present disclosure includes the following steps.

Step 61: mobile originated (Mobile Originated, MO) or mobile terminated (Mobile Terminated, MT) IMS session establishment.

Step 62: a 5G radio access network (5G radio access network) receives a QoS flow establishment request for a voice service.

Step 63: the 5G radio access network rejects the QoS flow establishment request with a rejection reason indicating a CS handover from the 5G network to the 3G network.

In some optional embodiments of the present disclosure, the indication information for the operation from the first network to the second network is as described in the step 12, which will not be described herein.

In one implementation, the 5G radio access network obtains, from the terminal, related information of a radio capability of the operation from the 5G network to the 3G network.

In one implementation, the 5G radio access network may obtain the related indication information for the operation from the 5G network to the 3G network through at least one of the following manners: when receiving the QoS flow establishment request for the voice service, or, before receiving the QoS flow establishment request for the voice service.

The related indication information for the operation from the 5G network to the 3G network may include two indications or one indication. For example, upon receiving an indication of capable of performing the operation from the 5G network to the 3G network, according to the indication, the radio access network can configure the terminal to perform measurement on the 3G network and obtain a 3G network measurement report; and subsequently, according to a received voice-related QoS flow establishment request and/or a received indication of CS handover from the 5G network to the 3G network, the radio access network can initiate a CS handover from the 5G network to the 3G network;

the 3G network frequency is pre-configured into the 5G network radio access network; according to a received indication of capable of performing the operation from the 5G network to the 3G network, the radio access network receives a voice-related QoS flow establishment request and/or an indication of CS handover from the 5G network to the 3G network, and the radio access network can initiate a CS handover from the 5G network to the 3G network.

Step 64: the 5G radio access network transmits a handover request message to the 5G core network; where the message includes at least one of the following: an indication of CS handover from the 5G network to the 3G network, a source RNC to target RNC transparent container, a CSG ID, a CSG Mode, or an MS Class Mark 2.

The 5G core network transmits a PS to CS handover request to a network unit of the 3G network. In one implementation, the 5G core network transmits a PS to CS handover request to the network unit of the 3G network through a proxy network unit.

The subsequent handover procedure is omitted.

Third Embodiment

In the third embodiment, when a terminal performs related service on the 5G network, if subsequent 5G network coverage does not meet requirements, the 5G network initiates a handover to hand over the terminal to the 3G network, thereby maintaining continuity of related service.

Figure 7:
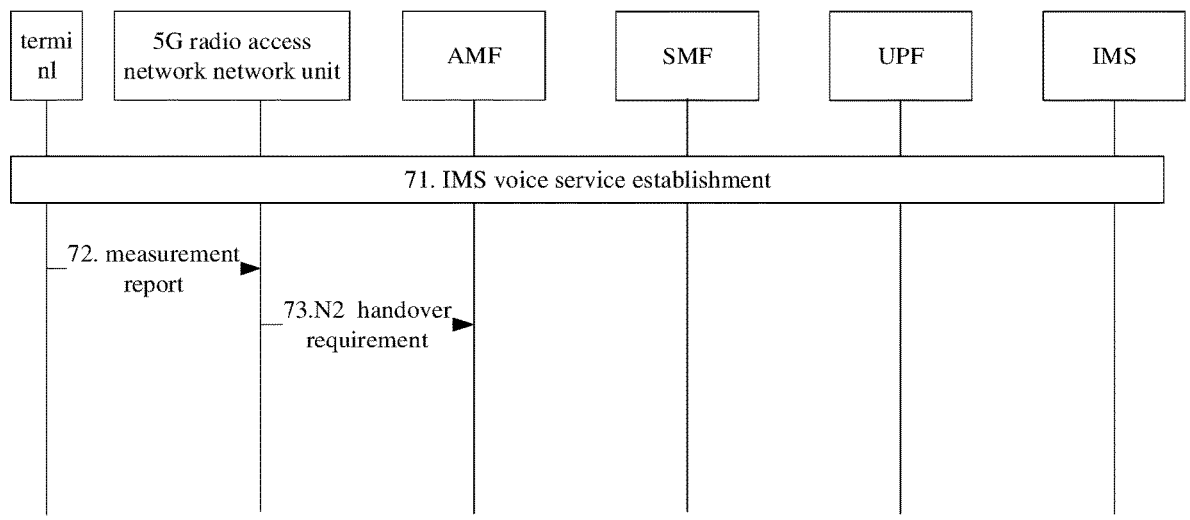
FIG. 7 is a schematic flowchart of a method for implementing service according to a third embodiment of the present disclosure.

Referring to FIG. 7, FIG. 7 is a schematic flowchart of a method for implementing service according to a third embodiment of the present disclosure. The method for implementing service of the embodiment of the present disclosure includes the following steps.

Step 71: a terminal initiates or terminates a voice service on the 5G network.

Step 72: a radio access network receives a measurement report, and an event of handover out from the 5G network occurs Optionally, according to an obtained related indication information of an operation from the 5G network to the 3G network, the 5G radio access network performs related operation from the 5G network to the 3G network for the terminal.

The 5G radio access network has obtained the related indication information of the operation from the 5G network to the 3G network before the handover occurs.

The 5G radio access network transmits a handover request message to the 5G core network (such as AMF). The message includes at least one of the following: an indication of CS handover from the 5G network to the 3G network, a source RNC to target RNC transparent container, a CSG ID, a CSG Mode, or an MS Class Mark 2.

The 5G core network transmits a PS to CS handover request to a network unit of the 3G network.

In one implementation, the 5G core network transmits a PS to CS handover request to the network unit of the 3G network through a proxy network unit.

Step 73: The subsequent handover procedure is omitted.

Fourth Embodiment

In the fourth embodiment, a terminal initiates a service establishment of a related service on the 5G network, and the 5G network initiates a handover to hand over the terminal to 3G, thereby supporting the related service.

Figure 8:
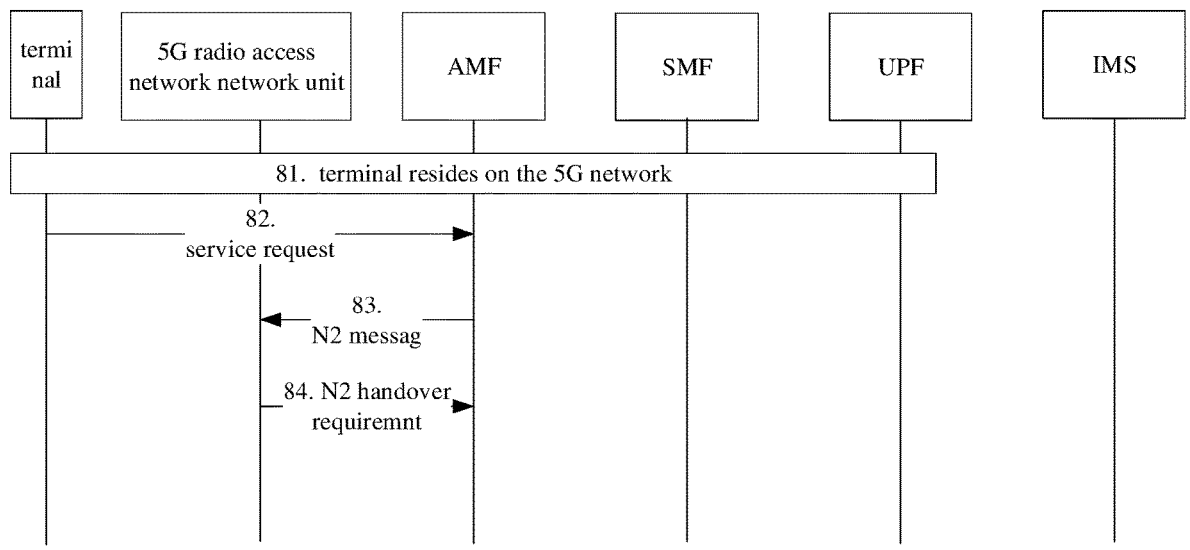
FIG. 8 is a schematic flowchart of a method for implementing service according to a fourth embodiment of the present disclosure.

Referring to FIG. 8, FIG. 8 is a schematic flowchart of a method for implementing service according to a fourth embodiment of the present disclosure. The method for implementing service of the embodiment of the present disclosure includes the following steps.

Step 81: the terminal camps on the 5G network.

Step 82: when the terminal needs to perform a related service, the terminal transmits a service request to the 5G core network (such as AMF), wherein the service request indicates the related service.

Optionally, according to an obtained related information of an operation from the 5G network to the 3G network, the 5G core network determines indication information for the operation from the 5G network to the 3G network.

In some optional embodiments of the present disclosure, the related information of the operation from the 5G network to the 3G network is as described in the step 12, which will not be described herein.

In some optional embodiments of the present disclosure, the indication information for the operation from the first network to the second network is as described in the step 12, which will not be described herein.

Step 83: the 5G core network transmits an N2 interface message to the 5G radio access network. Optionally, the message includes the indication information for the operation from the first network to the second network.

Optionally, according to an obtained related indication information of an operation from the 5G network to the 3G network, the 5G radio access network performs related operation from the 5G network to the 3G network for the terminal.

In one implementation, the 5G radio access network obtains, from the terminal, related information of a radio capability of the operation from the 5G network to the 3G network.

In one implementation, the 5G radio access network may obtain the related indication information for the operation from the 5G network to the 3G network through at least one of the following manners: when receiving the QoS flow establishment request for the voice service, or, before receiving the QoS flow establishment request for the voice service.

The related indication information for the operation from the 5G network to the 3G network may include two indications or one indication. For example, upon receiving an indication of capable of performing the operation from the 5G network to the 3G network, according to the indication, the radio access network can configure the terminal to perform measurement on the 3G network and obtain a 3G network measurement report; and subsequently, according to a received voice-related QoS flow establishment request and/or a received indication of CS handover from the 5G network to the 3G network, the radio access network can initiate a CS handover from the 5G network to the 3G network;

the 3G network frequency is pre-configured into the 5G network radio access network; according to a received indication of capable of performing the operation from the 5G network to the 3G network, the radio access network receives a voice-related QoS flow establishment request and/or an indication of CS handover from the 5G network to the 3G network, and the radio access network can initiate a CS handover from the 5G network to the 3G network.

Step 84: the 5G radio access network transmits a handover request message to the 5G core network; where the message includes at least one of the following: an indication of CS handover from the 5G network to the 3G network, a source RNC to target RNC transparent container, a CSG ID, a CSG Mode, or an MS Class Mark 2.

The 5G core network transmits a PS to CS handover request to a network unit of the 3G network. In one implementation, the 5G core network transmits a PS to CS handover request to the network unit of the 3G network through a proxy network unit.

Step 84: the subsequent handover procedure is omitted.

Figure 9:
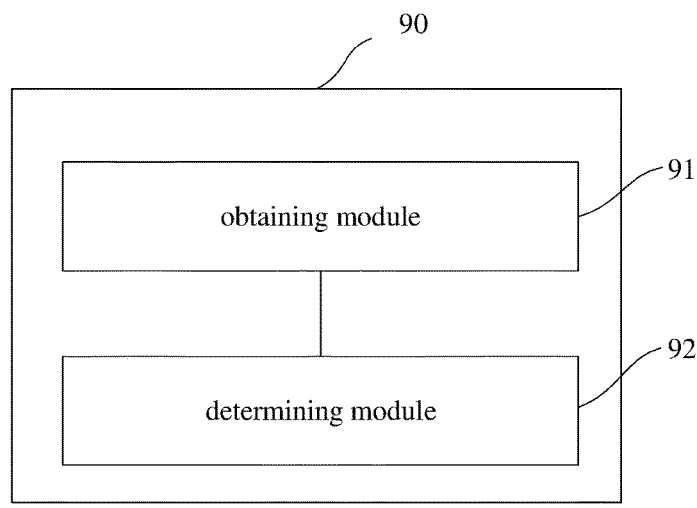
FIG. 9 is a schematic structural diagram of a first network unit according to an embodiment of the present disclosure.

Referring to FIG. 9, FIG. 9 is a schematic structural diagram of a first network unit according to an embodiment of the present disclosure. A first network unit 90 in the embodiment of the present disclosure is located in a first network and includes:

an obtaining module 91 configured to obtain related information of an operation from a first network to a second network;

a determining module 92 configured to, according to the related information of the operation from the first network to the second network, determine indication information for the operation from the first network to the second network, and/or, determine indication information of whether to support related service.

In the embodiment of the present disclosure, the following problems are clarified: 1) how to realize continuity of the related service in the case that the first network does not have full coverage; 2) when the first network does not directly support the related service but receives an establishment request for the related service (such as, a protocol data unit (Protocol Data Unit, PDU) session establishment request, quality of service (Quality of Service, QoS) flow establishment request, service request), how to implement the related service; 3) when the continuity of the related service is unable to be guaranteed on the first network, whether the terminal still camps on the first network.

In some optional embodiments of the present disclosure, the obtaining module 91 may obtain the related information of the operation from the first network to the second network, from at least one of the following:

a terminal;
an access management function;
a session management function;
a radio access network of the first network;
a unified data management function;
a network unit of a third network;
a network unit of the second network.

In some embodiments of the present disclosure, the related information of the operation from the first network to the second network is as described in the method embodiment of the first network unit, and details are not described herein.

In some optional embodiments of the present disclosure, the first network may be a 5G network, and the second network may be a 3G network. The related service may include one of the following: a voice service and an emergency service.

In some embodiments of the present disclosure, the related interface mode for the operation from the first network to the second network is as described in the method embodiment of the first network unit, and details are not described herein.

In some optional embodiments of the present disclosure, the indication information for the operation from the first network to the second network is as described in the method embodiment of the first network unit, and details are not described herein.

In some optional embodiments of the present disclosure, the first network unit may further include:

a transmission module, configured to transmit the indication information for the operation from the first network to the second network, to the terminal and/or a network unit in the radio access network.

In some optional embodiments of the present disclosure, the determining module 92 is further configured to, according to the related information of the operation from the first network to the second network, judge whether the following conditions are met: whether capable of performing the operation from the first network to the second network, whether capable of performing handover from the first network to the second network CS domain, and/or, whether capable of guaranteeing the continuity of the related service; according to a judgment result, determine the indication information of whether the related service is supported.

In some optional embodiments of the present disclosure, the determining module 92 may be further configured to indicate that the related service is supported in the indication information of whether to support the related service, in case that the at least one of the following conditions is met:

capable of performing the operation from the first network to the second network;

capable of performing handover from the first network to the second network;

capable of performing handover from the first network to the second network CS domain;

capable of maintaining the continuity of the related service.

The indication information for indicating whether the first network unit supports the service indicates that the first network unit does not support the service, when at least one of the following conditions is met:

not supporting the operation from the first network to the second network;

not supporting CS handover from the first network to the second network;

unable to guarantee continuity of the related service.

In the embodiment of the present disclosure, the indication information for determining whether the related service is supported is as described in the foregoing method embodiment of the first network unit and details are not described herein.

Figure 10:
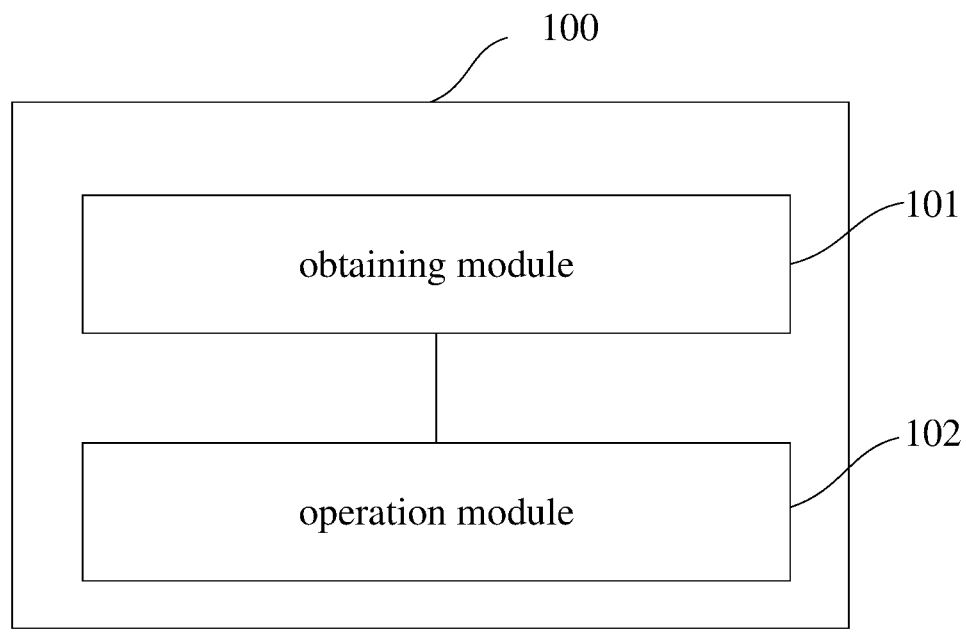
FIG. 10 is a schematic structural diagram of a second network unit according to an embodiment of the present disclosure.

Referring to FIG. 10, FIG. 10 is a schematic structural diagram of a second network unit according to an embodiment of the present disclosure. A second network unit 100 in the embodiment of the present disclosure is located in A first network, and includes:

an obtaining module 101 configured to obtain information; where the information includes at least one of: related information of an operation from a first network to a second network, or indication information for the operation from the first network to the second network;

an operation module 102 configured to perform the operation from the first network to the second network for a terminal, according to the obtained information.

In the embodiment of the present disclosure, the following problems are clarified: 1) how to realize continuity of the related service in the case that the first network does not have full coverage; 2) when the first network does not directly support the related service but receives an establishment request for the related service (such as, a PDU session establishment request, QoS flow establishment request, service request), how to implement the related service; 3) when the continuity of the related service is unable to be guaranteed on the first network, whether the terminal still camps on the first network.

In some optional embodiments of the present disclosure, the related information of the operation from the first network to the second network is as described in the method embodiment of the first network unit, and details are not described herein.

In some optional embodiments of the present disclosure, the operation from the first network to the second network may include at least one of the following:

related operations of handover from the first network to the second network;

related operations of handover from the first network to the second network CS domain;

maintaining continuity of the related service.

In some optional embodiments of the present disclosure, the related operations of handover from the first network to the second network may include at least one of the following:

initiating a handover procedure from the first network to the second network;

initiating a handover procedure from the first network to the second network CS domain;

transmitting an instruction of handover from the first network to the second network CS domain, and redirecting the terminal to the second network.

In some optional embodiments of the present disclosure, the operation module 102 may perform at least one of the following:

performing the operation from the first network to the second network, when the information indicates capable of perming the operation from the first network to the second network or capable of maintaining continuity of the related service;

not performing the operation from the first network to the second network or releasing radio connection of the terminal, when the information indicates of not capable of perming the operation from the first network to the second network or not capable of maintaining continuity of the related service;

performing the operation from the first network to the second network, when the information indicates that there is occurrence of a handover event of the related service handover out of the first network, and capable of perming the operation from the first network to the second network or capable of maintaining continuity of the related service;

not performing the operation from the first network to the second network or not releasing radio connection of the terminal, when the information indicates that there is occurrence of a handover event of the related service handover out of the first network, and not capable of perming the operation from the first network to the second network or not capable of maintaining continuity of the related service;

initiating a handover operation from the first network to the second network CS domain, when the information indicates that an instruction of handover from the first network to the second network CS domain is received;

initiating a handover operation from the first network to the second network CS domain, when the information indicates an instruction of handover from the first network to the second network CS domain and a QoS flow establishment request for the related service is received;

initiating a handover operation from the first network to the second network CS domain, when the information indicates that there is no occurrence of a handover event of the related service handover out of the first network, an instruction of handover from the first network to the second network CS domain is received and a QoS flow establishment request for the related service is received.

In some optional embodiments of the present disclosure, the first network may be a 5G network, and the second network may be a 3G network. The related service may include one of the following: a voice service and an emergency service.

Figure 11:
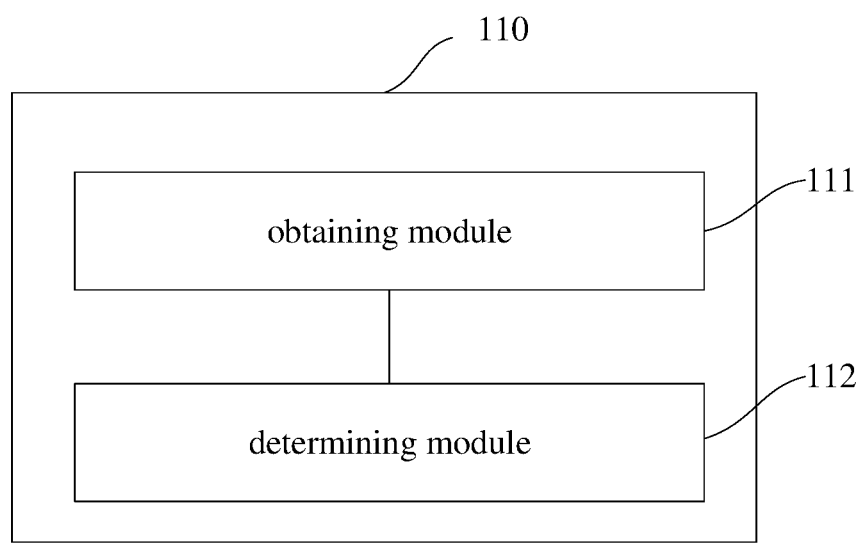
FIG. 11 is a schematic structural diagram of a terminal according to an embodiment of the present disclosure.

Referring to FIG. 11, FIG. 11 is a schematic structural diagram of a terminal according to an embodiment of the present disclosure. A terminal 110 in the embodiment of the present disclosure includes:

an obtaining module 111 configured to obtain indication information for an operation from a first network to a second network;

a determining module 112 configured to determine an operation for the related service, according to the indication information for the operation from the first network to the second network.

In the embodiment of the present disclosure, the following problems are clarified: 1) how to realize continuity of the related service in the case that the first network does not have full coverage; 2) when the first network does not directly support the related service but receives an establishment request for the related service (such as, a PDU session establishment request, QoS flow establishment request, service request), how to implement the related service; 3) when the continuity of the related service is unable to be guaranteed on the first network, whether the terminal still camps on the first network.

In some optional embodiments of the present disclosure, the terminal may further include:

a transmission module configured to transmit related information of the operation from the first network to the second network when accessing the first network.

In some optional embodiments of the present disclosure, the operation of the related service may include at least one of the following:

selecting an access domain;
determining whether to camp on the first network;
determining whether to initiate or terminate a request for the related service on the first network.

In some optional embodiments of the present disclosure, when the indication information indicates capable of perming the operation from the first network to the second network or capable of maintaining continuity of the related service, the determining module may perform at least one of the following:

initiating or terminating the related service on the first network;

initiating establishment of a PDU session for the related service on the first network;

initiating a service request for indicating the related service on the first network;

selecting to camp on the first network.

When the indication information indicates not capable of perming the operation from the first network to the second network or not capable of maintaining continuity of the related service, the determining module may perform at least one of the following:

not initiating or terminating the related service on the first network;

not initiating establishment of a PDU session for the related service on the first network;

not initiating a service request for indicating the related service on the first network;

not camping on the first network.

In some optional embodiments of the present disclosure, the first network may be a 5G network and the second network may be a 3G network. The related service may include one of the following: a voice service and an emergency service.

In foregoing embodiments of the present disclosure, the network unit may be any network device or network function. For example, the network unit may be a network unit of the radio access network or a network unit of the core network.

In embodiments of the present disclosure, the network unit of the core network may include at least one of the following: a core network device, a core network node, a core network function, a core network unit, a mobility management entity (Mobility Management Entity, MME), an access management function (Access Management Function, AMF), a session management function (Session Management Function, SMF), a user plane function (User Plane Function, UPF), a serving GW (Serving GW, SGW), a PDN gate way (PDN Gate Way, PDN GW), a policy control function (Policy Control Function, PCF), a policy and charging rules function (Policy and Charging Rules Function, PCRF), a serving GPRS support node (Serving GPRS Support Node, SGSN), or a gateway GPRS support node (Gateway GPRS Support Node, GGSN) radio access network device.

In embodiments of the present disclosure, the network unit of the radio access network may include at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved Node B (evolved Node B, eNB), a 5G base station (gNB), a radio network controller (Radio Network Controller, RNC), a base station (NodeB), a non-3GPP inter working function (Non-3GPP Inter Working Function, N3IWF), an access controller (Access Controller, AC) node, an access point (Access Point, AP) device or wireless local area networks (Wireless Local Area Networks, WLAN) node.

The base station may be a base transceiver station (Base Transceiver Station, BTS) in a global system for mobile communications (Global System for Mobile communications, GSM) or a code division multiple access (Code Division Multiple Access, CDMA), or may be a base station (NodeB) in a wideband code division multiple access (Wideband Code Division Multiple Access, WCDMA), or may also be an evolutional Node B (evolutional Node B, eNB or e-NodeB) in a long term evolution (LTE) or a 5G base station (gNB), which is not limited in the embodiment of the present disclosure.

In the present disclosure, an evolved LTE (evolved LTE, eLTE) is a way in which an evolved universal terrestrial radio access (Evolved Universal Terrestrial Radio Access, EUTRA) is directly connected to a 5G core network (5G Core, 5GC). An evolved packet system (Evolved Packet System, EPS) may also be referred to as LTE.

Figure 12:
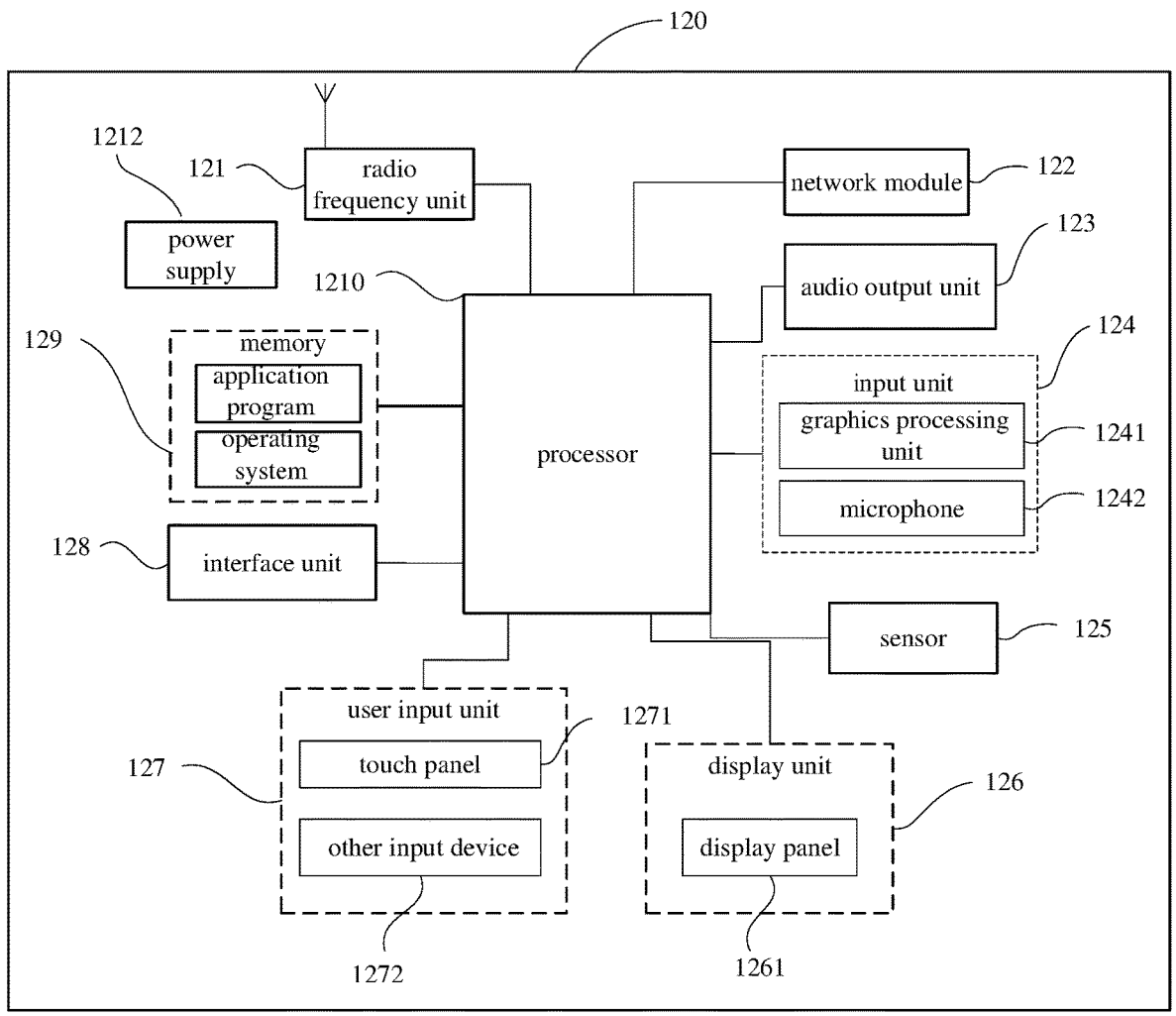
FIG. 12 is a schematic structural diagram of a terminal according to another embodiment of the present disclosure.

Referring to FIG. 12, FIG. 12 is a schematic structural diagram of a terminal according to another embodiment of the present disclosure. A terminal 120 includes, but not limited to: a radio frequency unit 121, a network module 122, an audio output unit 123, an input unit 124, a sensor 125, a display unit 126, a user input unit 127, an interface unit 128, a memory 129, a processor 1210, and a power supply 1212. It will be appreciated by those skilled in the art that structures of the terminal shown in FIG. 12 do not constitute a limitation of a terminal, which may include more or fewer components than illustrated, or have some components combined, or different component arrangements. In one embodiment of the present disclosure, the terminal includes, but not limited to, a mobile phone, a tablet computer, a notebook computer, a palmtop computer, an in-vehicle terminal, a wearable device, a pedometer, and the like.

The processor 1210 is configured to transmit related information of an operation from a first network to a second network when accessing the first network.

In the embodiment of the present disclosure, the following problems are clarified: 1) how to realize continuity of the related service in the case that the first network does not have full coverage; 2) when the first network does not directly support the related service but receives an establishment request for the related service (such as, a PDU session establishment request, QoS flow establishment request, service request), how to implement the related service; 3) when the continuity of the related service is unable to be guaranteed on the first network, whether the terminal still camps on the first network.

It should be understood that in some embodiments of the present disclosure, the radio frequency unit 121 may be used to receive and transmit signals during receiving and transmitting information or a call. Specifically, the radio frequency unit 121 receives downlink data from a base station and then transmits the downlink data to the processor 1210 for processing. Uplink data is transmitted to the base station. Generally, the radio frequency unit 121 includes, but is not limited to, an antenna, at least one amplifier, a transceiver, a coupler, a low noise amplifier, a duplexer, and the like. In addition, the radio frequency unit 121 may also communicate with the network and other devices through a wireless communication system.

The terminal provides wireless broadband internet access to the user through the network module 122, such as assisting the user in receiving and transmitting email, browsing web pages, and accessing streaming media.

The audio output unit 123 may convert the audio data received by the radio frequency unit 121 or the network module 122 or stored in the memory 129 into an audio signal and output as sound. Moreover, the audio output unit 123 may also provide audio output (e.g., call signal reception sound, message reception sound, etc.) related to a specific function performed by the terminal 120. The audio output unit 123 includes a speaker, a buzzer, a receiver, and the like.

The input unit 124 is used for receiving an audio or video signal. The input unit 124 may include a graphics processing unit (Graphics Processing Unit, GPU) 1241 and a microphone 1242. The GPU 1241 processes image data of static pictures or videos obtained by an image capturing apparatus (such as a camera) in a video capturing mode or an image capturing mode. The processed image frame may be displayed on the display unit 126. The image frames processed by the graphics processor 1241 may be stored in the memory 129 (or other storage medium) or transmitted via the radio frequency unit 121 or the network module 122. The microphone 1242 can receive sound and can process such sound into audio data. The processed audio data may be converted into a format output that may be transmitted to the mobile communication base station via the radio frequency unit 121 in the case of a telephone talk mode.

The terminal 120 further includes at least one sensor 125, such as a light sensor, a motion sensor, and other sensors. Specifically, the light sensor includes an ambient light sensor and a proximity sensor. The ambient light sensor can adjust brightness of a display panel 1261 according to the brightness of the ambient light. The proximity sensor can turn off the display panel 1261 and/or backlight when the terminal 120 moves to the ear. As one of the motion sensors, an accelerometer sensor can detect the magnitude of the acceleration in each direction (generally three axes), can detect the magnitude and direction of the gravity when stationary, and can be used to identify the attitude of the terminal (such as horizontal/vertical screen switching, related games, magnetometer attitude calibration), vibration identification related functions (such as pedometer, knocking), and the like. The sensor 125 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 126 is used to display information input by or provided to the user. The display unit 126 may include a display panel 1261, which may be configured in the form of a liquid crystal display (Liquid Crystal Display, LCD), an organic light-emitting diode (Organic Light-Emitting Diode, OLED), or the like.

The user input unit 127 may be used to receive the input number or character information, and to generate a key signal input related to the user setting and the function control of the terminal. Specifically, the user input unit 127 includes a touch panel 1271 and other input devices 1272. The touch panel 1271, also referred to as a touch screen, may collect touch operations on or near the touch panel (e.g., operations on or near the touch panel 1271 using any suitable object or accessory, such as a finger, stylus, or the like). The touch panel 1271 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 1210, receives commands from the processor 1210 and execute them. In addition, the touch panel 1271 may be implemented in various types such as a resistive type, a capacitive type, an infrared ray, and a surface acoustic wave. In addition to the touch panel 1271, the user input unit 127 may further include other input devices 1272. Specifically, other input devices 1272 may include, but are not limited to, a physical keyboard, a function key (such as a volume control key, an on-off key), a trackball, a mouse, and a joystick, which will not be elaborated herein.

Further, the touch panel 1271 may be overlaid on the display panel 1261. When the touch panel 1271 detects a touch operation on or near the touch panel, the touch panel 1271 transmits it to the processor 1210 to determine a type of a touch event. Then, the processor 1210 provides a corresponding visual output on the display panel 1261 according to the type of the touch event. Although in FIG. 12, the touch panel 1271 and the display panel 1261 are implemented as two separate components to implement the input and output functions of the terminal, in some embodiments, the touch panel 1271 and the display panel 1261 may be integrated to implement the input and output functions of the terminal, which are not specifically limited herein.

The interface unit 128 is an interface through which an external device is connected to the terminal 120. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 128 may be used to receive input (e.g., data information, power, etc.) from the external device and transmit the received input to one or more elements within the terminal 120 or may be used to transmit data between the terminal 120 and the external device.

The memory 129 may be used to store software programs and various data. The memory 129 may mainly include a program storage area and a data storage area. The program storage area may store an operating system, an application program (such as a sound play function, an image play function) required by at least one function, and the like. The data storage area may store data (such as audio data, a phone book) created according to use of the terminal. In addition, the memory 129 may include high speed random access memory, and may also include non-volatile memory, such as at least one magnetic disk storage device, flash memory device, or other volatile solid state storage device.

The processor 1210 is a control center of the terminal, connects various parts of the entire terminal by various interfaces and lines, executes various functions of the terminal and processes data by running or executing software programs and/or modules stored in the memory 129 and invoking data stored in the memory 129, thereby performing overall monitoring of the terminal. The processor 1210 may include one or more processing units. Optionally, the processor 1210 may integrate an application processor and a modem processor. The application processor primarily processes the operating system, the user interface and the application program. The modem processor primarily processes wireless communications. It will be appreciated that the modem processor may also not be integrated into the processor 1210.

The terminal 120 may further include a power source 1212 (such as a battery) that supplies power to the various components. Optionally, the power source 1212 may be logically connected to the processor 1210 through a power management system to perform functions such as managing charging, discharging, and power consumption management through the power management system.

In addition, the terminal 120 includes functional modules not shown, which will not be elaborated herein.

Optionally, one embodiment of the present disclosure further provides a first network unit, including a processor, a memory, a computer program stored on the memory and executable on the processor. The computer program is executed by the processor to implement procedures of the method for implementing service in the foregoing embodiment with the same technical effect achieved. To avoid repetition, details are not described herein.

Optionally, one embodiment of the present disclosure further provides a second network unit, including a processor, a memory, a computer program stored on the memory and executable on the processor. The computer program is executed by the processor to implement procedures of the method for implementing service in the foregoing embodiment with the same technical effect achieved. To avoid repetition, details are not described herein.

Optionally, one embodiment of the present disclosure further provides a terminal, including a processor, a memory, a computer program stored on the memory and executable on the processor. The computer program is executed by the processor to implement procedures of the method for implementing service in the foregoing embodiment with the same technical effect achieved. To avoid repetition, details are not described herein.

One embodiment of the present disclosure further provides a computer readable storage medium. The computer readable storage medium stores a computer program. The computer program is executed by a processor to implement procedures of the method for implementing service in the foregoing embodiment with the same technical effect achieved. To avoid repetition, details are not described herein. The computer readable storage medium, may be, for example, a read-only memory (Read-Only Memory, ROM), a random access memory (Random Access Memory, RAM), a magnetic disk, or an optical disk.

It is to be understood that the terms such as "include" and "comprises" or their variations used in the specification are intended to encompass a non-exclusive inclusion, such that a process, method, article or device that include a series of elements include not only those elements but also other elements that are not explicitly listed, or elements that are inherent to such process, method, article, or device. Without more restrictions, an element defined by the sentence "including a . . . " does not exclude existence of other identical element in the process, method, article or device that includes the element.

Through the description of the above embodiments, those skilled in the art can clearly understand that the foregoing embodiment method can be implemented by means of software plus a necessary general hardware platform, and, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, an air conditioner, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

What is claimed is:

1. A method for implementing service, operable by a first network unit in a first network, comprising:
   obtaining related information of an operation from the first network to a second network;
   according to the related information of the operation from the first network to the second network, determining whether capable of performing a circuit switch (CS) handover from the first network to the second network;
   according to whether capable of performing the CS handover from the first network to the second network, determining the indication information of whether a related service is supported;
   wherein the indication information of whether the related service is supported comprises at least one of the following:
   indication information of whether IMS voice service is supported;
   indication information of whether IMS voice service over packet switch (PS) is supported;
   indication information of whether IMS voice service over PS session over 3GPP is supported;
   indication information of whether IMS voice service over CS is supported;

indication information of whether an emergency service is supported; or, indication information of whether emergency service fallback is supported.

2. The method according to claim 1, wherein the related information of the operation from the first network to the second network comprises at least one of the following:

whether the first network configures a related interface that supports the operation from the first network to the second network;

a related interface mode configured by the first network for the operation from the first network to the second network;

second network capability information of a terminal;

information of whether the terminal supports the operation from the first network to the second network;

information of whether a network unit of the first network supports the operation from the first network to the second network;

whether the terminal allows the operation from the first network to the second network;

an IP multimedia subsystem (IMS) session transfer number of the terminal;

information of whether there is the IMS session transfer number of the terminal;

a mobile subscriber international subscriber identifier of the terminal;

whether there is the mobile subscriber international subscriber identifier of the terminal;

whether a terminal identifier of the terminal in the first network is able to be mapped to a terminal identifier in the second network;

whether a type of an subscription permanent identifier of the terminal is an international mobile subscriber identification number;

the terminal is in a single registration mode or a dual registration mode;

whether the terminal is a single radio or a dual radio;

whether the terminal is voice centric or data centric;

operator policies;

whether an operator configures the operation from the first network to the second network to support the related service;

whether the operator configures the operation from the first network to the second network to support continuity of the related service;

radio condition;

whether radio condition of the terminal meets the operation from the first network to the second network;

information of the related service;

whether there is ongoing related service;

whether a request for the related service is received; or, the operation from the first network to the second network is a CS handover from the first network to the second network.

3. The method according to claim 1, wherein the first network is a 5G network, and the second network is a 3G network; the related service comprises one of the following: a voice service and an emergency service.

4. The method according to claim 2, wherein the related interface mode for the operation from the first network to the second network comprises at least one of the following:

the first network operates with the second network through a direct interface; or, the first network interacts with a third network and then the third network interacts with the second network to realize operations between the first network and the second network.

5. The method according to claim 1, wherein the indication information of whether the related service is supported indicates that the related service is supported, in case that the following conditions is met:

capable of performing a CS handover from the first network to the second network.

6. The method according to claim 3, wherein
the 5G network comprises: NG RAN; and/or,
the 3G network comprises: UTRAN.

7. The method according to claim 1, wherein the method further comprises:

transmitting, by the first network unit, the indication information of whether the related service is supported, to a terminal.

8. A computer readable storage medium, comprising a program stored thereon;

wherein the program is executed by a processor to implement steps of the method according to claim 1.

9. A method for implementing service, operable by a second network unit in a first network, comprising:

obtaining information; wherein the information comprises at least one of: related information of an operation from the first network to a second network, or indication information for the operation from the first network to the second network;

performing the operation from the first network to the second network for a terminal, according to the obtained information;

wherein the indication information for the operation from the first network to the second network comprises at least one of the following:

indication information of whether handover from the first network to the second network is able to be performed;

indication information of whether a circuit switch (CS) handover from the first network to the second network is able to be performed;

indication information of whether service continuity is able to be maintained;

wherein the step of performing the operation from the first network to the second network for a terminal, according to the obtained information, comprises:

performing the operation from the first network to the second network, when the information indicates capable of performing the operation from the first network to the second network or capable of maintaining continuity of the related service;

not performing the operation from the first network to the second network or releasing radio connection of the terminal, when the information indicates of not capable of performing the operation from the first network to the second network or not capable of maintaining continuity of the related service;

performing the operation from the first network to the second network, when the information indicates that there is occurrence of a handover event of the related service handover out of the first network, and capable of performing the operation from the first network to the second network or capable of maintaining continuity of the related service;

not performing the operation from the first network to the second network or not releasing radio connection of the terminal, when the information indicates that there is occurrence of a handover event of the related service handover out of the first network, and not capable of performing the operation from the first network to the second network or not capable of maintaining continuity of the related service;

initiating a CS handover operation from the first network to the second network, when the information indicates that an instruction of a CS handover from the first network to the second network is received;

initiating a CS handover operation from the first network to the second network, when the information indicates an instruction of a CS handover from the first network to the second network and a QoS flow establishment request for the related service is received; or, initiating a CS handover operation from the first network to the second network, when the information indicates that there is no occurrence of a handover event of the related service handover out of the first network, an instruction of a CS handover from the first network to the second network is received and a QoS flow establishment request for the related service is received.

10. The method according to claim 9, wherein the related information of the operation from the first network to the second network comprises at least one of the following:

whether the first network configures a related interface that supports the operation from the first network to the second network;

a related interface mode configured by the first network for the operation from the first network to the second network;

second network capability information of the terminal;

information of whether the terminal supports the operation from the first network to the second network;

information of whether a network unit of the first network supports the operation from the first network to the second network;

whether the terminal allows the operation from the first network to the second network;

an IP multimedia subsystem (IMS) session transfer number of the terminal;

information of whether there is the IMS session transfer number of the terminal;

a mobile subscriber international subscriber identifier of the terminal;

whether there is the mobile subscriber international subscriber identifier of the terminal;

whether a terminal identifier of the terminal in the first network is able to be mapped to a terminal identifier in the second network;

whether a type of an subscription permanent identifier of the terminal is an international mobile subscriber identification number;

the terminal is in a single registration mode or a dual registration mode;

whether the terminal is a single radio or a dual radio;

whether the terminal is voice centric or data centric;

operator policies;

whether an operator configures the operation from the first network to the second network to support the related service;

whether the operator configures the operation from the first network to the second network to support continuity of the related service;

radio condition;

whether radio condition of the terminal meets the operation from the first network to the second network;

information of the related service;

whether there is ongoing related service; or, whether a request for the related service is received.

11. The method according to claim 9, wherein the operation from the first network to the second network comprises at least one of the following:

a related operation of a handover from the first network to the second network;

a related operation of a CS handover from the first network to the second network; or, maintaining continuity of the related service;

wherein the related operation of the handover from the first network to the second network comprises at least one of the following:

initiating a handover procedure from the first network to the second network;

initiating a CS handover procedure from the first network to the second network; or, transmitting an instruction of a CS handover from the first network to the second network, and redirecting the terminal to the second network.

12. The method according to claim 9, wherein the first network is a 5G network, and the second network is a 3G network; the related service comprises one of the following: a voice service and an emergency service.

13. A second network unit, comprising: a processor, a memory, and a program stored on the memory and executable on the processor; wherein the program is executed by the processor to implement steps of the method according to claim 9.

14. A first network unit, comprising: a processor, a memory, and a program stored on the memory and executable on the processor; wherein the program is executed by the processor to implement:

obtaining related information of an operation from the first network to a second network;

according to the related information of the operation from the first network to the second network, determining whether capable of performing a circuit switch (CS) handover from the first network to the second network;

according to whether capable of performing the CS handover from the first network to the second network, determining the indication information of whether a related service is supported;

wherein the indication information of whether the related service is supported comprises at least one of the following:

indication information of whether IMS voice service is supported;

indication information of whether IMS voice service over packet switch (PS) is supported;

indication information of whether IMS voice service over PS session over 3GPP is supported;

indication information of whether IMS voice service over CS is supported;

indication information of whether an emergency service is supported; or, indication information of whether emergency service fallback is supported.

15. The first network unit according to claim 14, wherein the related information of the operation from the first network to the second network comprises at least one of the following:

whether the first network configures a related interface that supports the operation from the first network to the second network;

a related interface mode configured by the first network for the operation from the first network to the second network;

second network capability information of a terminal;

information of whether the terminal supports the operation from the first network to the second network;

information of whether a network unit of the first network supports the operation from the first network to the second network;
whether the terminal allows the operation from the first network to the second network;
an IP multimedia subsystem (IMS) session transfer number of the terminal;
information of whether there is the IMS session transfer number of the terminal;
a mobile subscriber international subscriber identifier of the terminal;
whether there is the mobile subscriber international subscriber identifier of the terminal;
whether a terminal identifier of the terminal in the first network is able to be mapped to a terminal identifier in the second network;
whether a type of an subscription permanent identifier of the terminal is an international mobile subscriber identification number;
the terminal is in a single registration mode or a dual registration mode;
whether the terminal is a single radio or a dual radio;
whether the terminal is voice centric or data centric;
operator policies;
whether an operator configures the operation from the first network to the second network to support the related service;
whether the operator configures the operation from the first network to the second network to support continuity of the related service;
radio condition;
whether radio condition of the terminal meets the operation from the first network to the second network;
information of the related service;
whether there is ongoing related service;
whether a request for the related service is received; or,
the operation from the first network to the second network is a CS handover from the first network to the second network.

16. The first network unit according to claim 14, wherein the first network is a 5G network, and the second network is a 3G network; the related service comprises one of the following: a voice service and an emergency service.

17. The first network unit according to claim 15, wherein the related interface mode for the operation from the first network to the second network comprises at least one of the following: the first network operates with the second network through a direct interface; or,
the first network interacts with a third network and then the third network interacts with the second network to realize operations between the first network and the second network.

18. The first network unit according to claim 14, wherein the indication information of whether the related service is supported indicates that the related service is supported, in case that the following condition is met:
capable of performing a CS handover from the first network to the second network.

19. The first network unit according to claim 16, wherein the 5G network comprises: NG RAN; and/or,
the 3G network comprises: UTRAN.

20. The first network unit according to claim 14, wherein the program is executed by the processor to further implement:
transmitting the indication information of whether the related service is supported, to a terminal.

* * * * *